United States Patent [19]

Parr

[11] 4,380,044
[45] Apr. 12, 1983

[54] D.C. TO D.C. CONVERTER WITH PLURAL FEEDBACK LOOPS

[75] Inventor: Andrew F. Parr, West Croydon, England

[73] Assignee: Imperial Chemical Industries PLC, London, England

[21] Appl. No.: 193,638

[22] Filed: Oct. 3, 1980

[30] Foreign Application Priority Data

Oct. 4, 1979 [GB] United Kingdom ............. 7934430

[51] Int. Cl.³ ............................................. H02M 3/335
[52] U.S. Cl. ........................................ 363/21; 363/56; 363/80
[58] Field of Search ................ 331/108 C; 363/15, 16, 363/20, 21, 60, 79, 80, 97, 131, 56

[56] References Cited

U.S. PATENT DOCUMENTS

| 3,564,393 | 2/1971 | Williamson | 363/21 X |
| 3,916,281 | 10/1975 | Owen | 363/21 |
| 4,028,596 | 6/1977 | Weber | 363/60 X |
| 4,104,714 | 8/1978 | Smith et al. | 363/21 |
| 4,131,843 | 12/1978 | Koyama et al. | 363/21 X |
| 4,281,373 | 7/1981 | Mabille | 363/21 |

FOREIGN PATENT DOCUMENTS

| 1933535 | 1/1970 | Fed. Rep. of Germany. | |
| 54-143815 | 11/1979 | Japan | 363/21 |
| 55-56469 | 4/1980 | Japan | 363/16 |
| 1231753 | 5/1971 | United Kingdom. | |
| 1412985 | 11/1975 | United Kingdom. | |
| 1472314 | 5/1977 | United Kingdom. | |

Primary Examiner—A. D. Pellinen
Attorney, Agent, or Firm—Watson, Cole, Grindle & Watson

[57] ABSTRACT

A d.c. to d.c. converter which produces from a low voltage battery supply a high voltage d.c. output. The converter comprises a step up transformer the primary of which receives current pulses under the control of an oscillator. For each current pulse, the current builds up steadily and is then abruptly cut off so as to induce a high voltage pulse in a secondary of the transformer. The high voltage pulses pass along a voltage multiplier to provide the high voltage d.c. output. Each high voltage pulse has associated with it a low voltage pulse in the primary which is used to control the rate of the oscillator. The oscillator is also controlled as a function of the peak current in the primary by a transistor, and the oscillator is further controlled to limit its maximum rate when the output current exceeds a given level, by means of a feedback loop.

8 Claims, 9 Drawing Figures

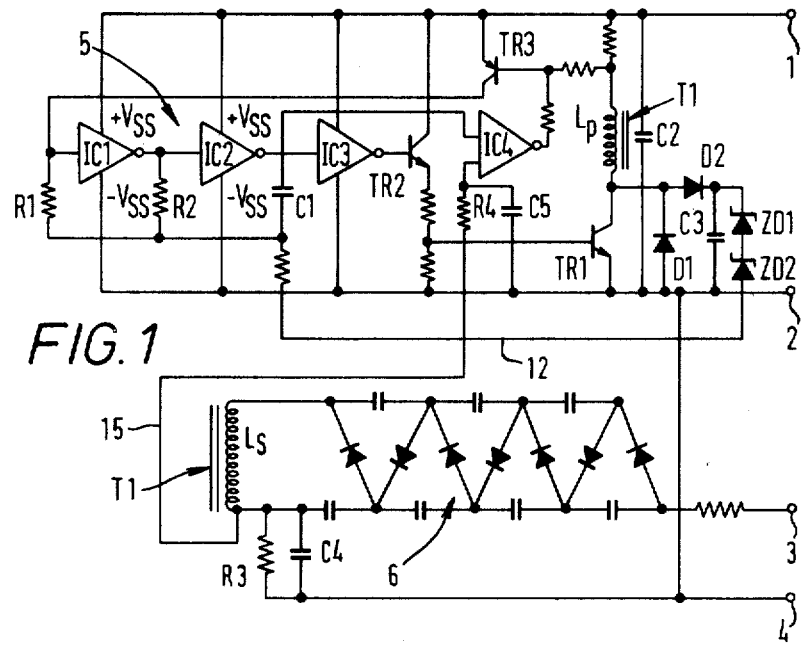
FIG. 1
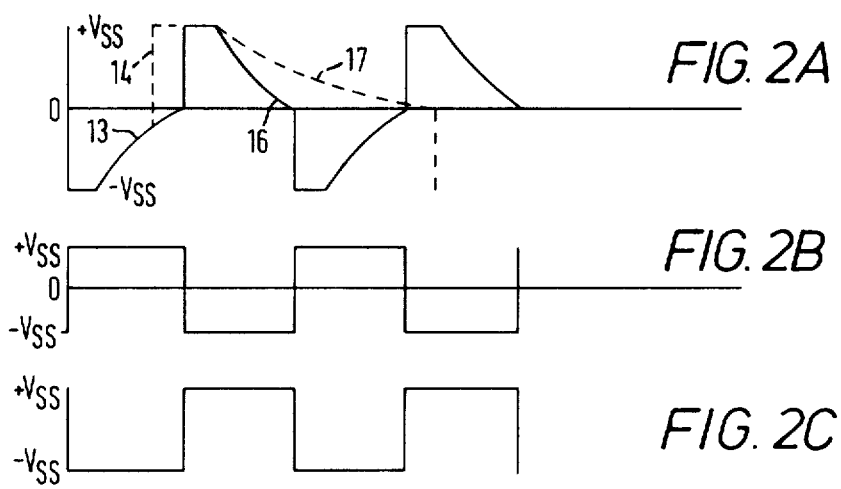
FIG. 2A
FIG. 2B
FIG. 2C
FIG. 2

D.C. TO D.C. CONVERTER WITH PLURAL FEEDBACK LOOPS

FIELD OF THE INVENTION

This invention relates to a d.c. to d.c. converter for developing a high voltage output from a relatively low voltage battery supply.

BACKGROUND TO THE INVENTION

Battery driven d.c. to d.c. converters are known and typically comprise an oscillator driven by a battery which feeds a relatively low voltage oscillatory signal to a primary winding of a transformer, so as to induce in a secondary winding of the transformer, a relatively high voltage oscillatory signal. This high voltage signal is rectified and smoothed to produce a high voltage output for application to a load. The converter may operate utilising the known flyback principle by which the low voltage oscillatory current is arranged to increase steadily in the primary winding and is then abruptly switched off so as to induce a high voltage pulse in the secondary winding when the primary winding current is switched off. Typically a voltage pulse of several kilovolts is induced in the secondary winding from for example a six volt battery supply.

It is desirable to include in the converter a control loop in order to control the high voltage output in the event of fluctuations of battery voltage or fluctuations in the impedance presented by the load. It would be possible to control the output voltage by sensing the output voltage directly and controlling the oscillator in dependence on the sensed voltage. However, because the output voltage may be several kilovolts in magnitude, the sensing could only be performed after first dropping the output voltage through resistors or like elements, with the consequent disadvantage of consuming battery power and reducing the efficiency of the converter. Such efficiency considerations are important where electrical apparatus is to be powered by the converter in a remote location where battery recharging or replacement cannot be achieved readily.

SUMMARY OF THE INVENTION

In accordance with the present invention it has been appreciated that with a converter operating by the aforesaid flyback principle, when a high voltage pulse is induced in the transformer secondary winding, a relatively low voltage pulse is consequently induced in the primary winding, the low voltage pulse having a magnitude which is a function of the magnitude of the high voltage pulse. The magnitude of the high voltage pulse is a determining factor in the output voltage of the converter. In accordance with the present invention, the magnitude of the low voltage pulse in the primary winding is sensed and used to control the oscillator, since the magnitude of the low voltage pulse provides an indication of the high voltage output of the converter, but at a much lower voltage, thereby obviating the requirement for power consuming dropping resistors and consequently increasing the efficiency of the converter.

According to one embodiment of the invention there is provided a d.c. to d.c. converter for providing a high voltage d.c. output from a low voltage battery supply, comprising a step up transformer having primary and secondary windings, oscillator means arranged to cause battery current to build up in the primary winding and then abruptly change in such a manner as to induce in the secondary winding a relatively high voltage pulse and such that there is formed in the primary winding a relatively low voltage pulse of a magnitude which is a function of the high voltage pulse in the secondary winding, output means coupled to said secondary winding so as to derive said high voltage d.c. output, and means responsive to said low voltage pulse in the primary winding and arranged to control the rate of operation of the oscillator means so as to control the magnitude of said high voltage d.c. output.

This arrangement thus has the advantage that in order to control the high voltage d.c. output, the output itself does not have to be sensed directly. If it were sensed directly, consequential battery losses would occur.

Preferably means are provided to sense the magnitude of the current flowing in the primary winding and to switch off the current when it reaches a predetermined magnitude.

Preferably, means are provided to sense the output current and to reduce the rate of operation of the oscillator means if the output current exceeds a given level, whereby to avoid flattening of the battery in the event of a load short circuit for example.

Preferably, the oscillator means comprises an oscillator circuit separate from the primary winding of the transformer, the oscillator circuit being arranged to drive a switching transistor in series with the primary winding.

In order that the invention may be more fully understood embodiments thereof will now be described by way of illustrative example with reference to the accompanying drawings:

BRIEF DESCRIPTION OF THE DRAWINGS

FIG. 1 is a schematic circuit diagram of a first embodiment of a converter in accordance with the invention;

FIG. 2 illustrates waveforms which occur in use of the oscillator shown in FIG. 1, FIG. 2A being the input waveform for inverter IC1, FIG. 2B being the output waveform of the inverter IC1, and FIG. 2C being the output waveform of inverter IC2;

DESCRIPTION OF PREFERRED EMBODIMENTS

Figure 3A:
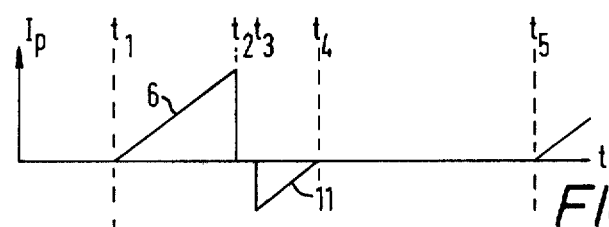
FIGS. 3A, 3B, 3C and 3D illustrate various waveforms which occur in use of the step up transformer T1, FIG. 3A illustrating the current flowing in the transformer primary winding $L_p$, FIG. 3B showing the voltage of the primary winding $L_p$, FIG. 3C representing the voltage of the transformer's secondary winding $L_s$, and FIG. 3D showing the base emitter voltage of the switching transistor TR1.
Figure 3B:
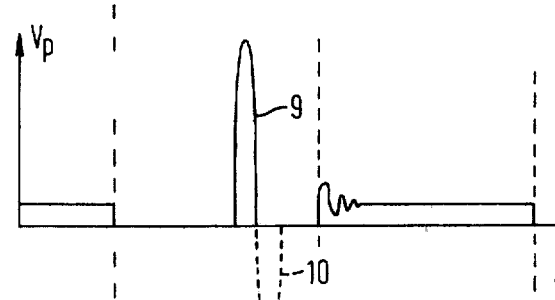
Figure 3C:
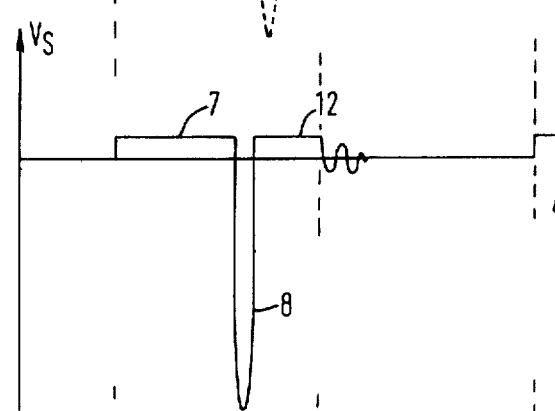
Figure 3D:

Referring now to FIG. 1, the converter is driven by a nominally 6 volt battery supply on bus lines 1, 2, and produces a high voltage output of nominally 24 KV at terminals 3, 4.

The circuit includes an oscillator 5 formed by two CMOS inverters IC1, IC2 connected in a loop with a resistor capacitor network $R_1R_2C_1$. A step up transformer T1 has its primary winding $L_p$ connected to receive low voltage current pulses from the battery lines 1, 2 under the control of the oscillator 5. As will be explained in detail hereinafter, the transformer T1 is operated on the flyback principle with the effect that high voltage pulses of typically 6 KV are induced in its secondary winding $L_s$. The secondary winding $L_s$ is connected to a conventional Cockcroft-Walton times four voltage multiplier 6 so as to produce the 24 KV output.

The operation of the oscillator 5 will now be described in more detail. The oscillator is essentially a free-running device but various feedback loops (to be described later) modify its running characteristics to control the output of the converter.

Considering now the CMOS inverters IC1, IC2, they each are connected to positive and negative supply rails $+V_{ss}$, $-V_{ss}$ and thus their outputs switch between the voltage level $\pm V_{ss}$ as is well known. Since the inverters each have their input connected to their output through the resistor capacitor network $R_1R_2C_1$, the inverters will tend to attain a condition in which their input voltage is equal to their output voltage and consequently is at the switching threshold of the inverter (normally 0 volts); this is well known. However, spurious noise will perturb the inverters from this condition and an oscillation will occur. Referring now to FIG. 2, waveforms A, B and C show the oscillatory voltages of the input of IC1, the output of IC1 and the output of IC2 respectively. When the input voltage of IC1 flips to a value $-V_{ss}$, the output voltage of IC1 is $+V_{ss}$ and the output voltage of IC2 is $-V_{ss}$. Now $R_1 > R_2$. Thus the voltage difference across IC2 causes the capacitor $C_1$ to receive a charging current through $R_2$ and the capacitor continues to charge until the voltage across it biasses the input of IC1 to its switching threshold (shown as 0 volts in FIG. 2), at which time the inverter IC1 flips its state so as to have $+V_{ss}$ input voltage. As a result, IC2 flips over and the bias voltages for the capacitor $C_1$ reverse causing the capacitor to discharge to the normally zero volt switching threshold of inverter IC1, and when the threshold is reached, the inverter IC1 flips its state and the cycle repeats. Thus, the oscillator 5 in its free running mode just described, will operate at a frequency determined substantially by $R_2$ and $C_1$.

Referring again to FIG. 1, a transistor TR1 is connected in series with the primary $L_p$ of the transformer, the transistor being switched on and off cyclically in response to the output waveform (FIG. 2C) of the oscillator 5, so as to switch cyclically the battery current through the primary $L_p$. The base of the transistor TR1 receives the output waveform of the oscillator 5 through a further inverting stage IC3 and an emitter follower TR2. A charge storing capacitor $C_2$ is switched in parallel with the primary $L_p$, between the battery rails 1,2. A diode D1 is connected in parallel with the collector emitter path of the transistor TR1.

Referring now to FIG. 3, the operation of the step up transformer T1 will be described for one cycle of operation of the oscillator 5. At a time $t_1$, the voltage applied to the base of transistor TR1 is caused by the oscillator 5 to step positively so as to switch on the transistor. Consequently, a current from the battery starts to flow through the primary $L_p$ so as to produce a ramp waveform 6 shown in FIG. 3A, the slope of the ramp (i.e. the rate of rise of current) being determined substantially by the value of the impedance of the primary $L_p$. This substantially linear current ramp 6 induces an essentially constant voltage 7 in the secondary winding $L_s$, of typically 200 volts.

At time $t_2$, the oscillator 5 causes the transistor TR1 to switch off thereby substantially instantaneously terminating the current flow in the primary $L_p$. The energy held in the primary then is transferred to the secondary $L_s$ by means of the known flyback principle and as a result a voltage pulse 8 (FIG. 3C) of typically 6 KV is induced in the secondary winding $L_s$.

Also, at this time, a voltage pulse 9 occurs in the primary winding $L_p$. This voltage pulse 9 is of a much lower magnitude than the pulse 8 and typically has a peak value of 200 volts. The pulse 9 can be considered to be produced by energy reflected back into the primary $L_p$ from the secondary $L_s$. During the occurrence of the pulse 9, the transistor TR1 is switched off and the diode D1 is reverse biased and hence no current can flow in the primary $L_p$. At time $t_3$ the energy in the primary winding $L_p$ would were it not for the diode D1 and the capacitor C2, attempt to resonate as an exponentially decaying sinusoid of which the next negative going half cycle is shown in dotted outline 10 in FIG. 3B. However, at time $t_3$, the voltage across the primary winding $L_p$ forward biases the diode, such that the energy in the primary manifests itself as a current which flows to charge up the capacitor C2, thereby producing a ramp waveform 11 as shown in FIG. 3A. The charge thereby stored in the capacitor C2 is held for the next cycle of operation so that it can be used to contribute to the next such ramp waveform 6. The stored energy in the capacitor C2 would, were it not for the capacitor C2 and the diode D2, have been dissipated in the circuit. Accordingly, the effect of the diode D1 and the capacitor C2 is to conserve energy from the battery. The substantially constant rate of charging of capacitor C2 defined by the ramp 11 induces a constant low voltage 12 of typically 200 volts in the secondary $L_s$.

At the time $t_4$ the diode D1 again becomes reverse biased, and the voltage of the primary $L_p$ decays sinusoidally to the battery voltage, the periodicity of the decay being defined by the resonant characteristics of a parallel inductance/capacitance circuit presented by the stray capacitance of the transformer and the multiplier stack 6 and the inductance of the secondary winding $L_s$.

At time $t_5$, the oscillator 5 causes the transistor TR1 to switch on again and the cycle repeats.

Thus, it can be seen that for each cycle of operation of the oscillator, the step up transformer T1 induces an energy pulse in its secondary $L_s$. The output voltage produced by the voltage multiplier 6 depends on the frequency and magnitude of these induced energy pulses, and in order to control the output of the multiplier 6, the converter of the inverter shown in FIG. 1 has feedback loops which control both the magnitude and the repetition rate of the induced energy pulses.

The feedback loop which maintains the magnitude of the pulses substantially constant will now be described. It can be shown that the magnitude of the pulse induced in the secondary winding $L_s$ is a function of the peak current that occurs in the primary winding $L_p$ just when the transistor TR1 is switched off, i.e. the peak value of the current ramp 6 shown in FIG. 3A. Thus, by controlling this peak current value to be constant, the value of the energy pulses induced in the secondary can be held constant. To this end, a transistor TR3, shown in FIG. 1 has its base connected to the current flow path through the primary winding $L_p$ of the transformer, and the transistor TR3 is arranged to switch on when the primary winding current reaches a predetermined value. The transistor TR3 when switched on, applies a current to the input of the inverter IC1 which causes it prematurely to flip over, so causing the transistor TR1 to switch off earlier than would otherwise occur, as shown at line 14, FIG. 2A. Thus variations in battery voltage and spurious fluctuations in component values which would alter the rate of rise of the primary winding current are compensated for. It will be appreciated that if for example the battery voltage is so low that the current ramp 6 does not reach the level set by the transistor TR3, the osciillator 5 will assume its free running mode and the inverter IC1 will flip over after a period defined by the values of resistor $R_2$ and the capacitor $C_1$. Thus, the provision of the feedback loop including the transistor TR3 maintains constant the peak voltage of the pulses induced in the secondary winding over a range of battery voltages, and moreover allows the circuit to continue operation (with reduced control) even when the battery voltage decays below the range.

Another feedback loop is provided to control the pulse repetition rate of the oscillator so as to control the rate at which pulses are induced in the secondary winding $L_s$ of the transformer. In this feedback loop, the peak voltage of the pulses 8 induced in the secondary winding $L_s$ is monitored, and the pulse repetition rate of the oscillator is reduced by an amount dependent upon by how much the peak voltage exceeds a predetermined reference value. An increased peak voltage induced in the secondary $L_s$ indicates that the induced pulses have an increased energy and thus by slowing down the pulse repetition rate of the oscillator, the rate of flow of pulses to the voltage multiplier 6 can be controlled so as to maintain the output voltage of the multiplier 6 constant. It will be appreciated by those skilled in the art that the voltage multiplier 6 works by transferring and integrating packets of charge by means of diodes along a chain of capacitors to achieve progressively higher voltages. In the present apparatus, the rate of charge transfer is thus controlled by the feedback loop in dependence upon the amount of charge in the packets, so as to keep the energy flow and consequently the final output voltage, constant irrespective of changes of load impedance over a given operating range.

In order to achieve this feedback loop it would be possible to monitor the 24 KV output directly, but this would require expensive and power consuming voltage dropping resistors or other elements in order to derive a signal of a suitable magnitude to be fed back to the CMOS inverters IC1, 2 which comprise the oscillator 5; such inverters can usually only operate with signals of the order of 10 volts so clearly a signal of 24 KV would not be suitable. This problem is overcome in the present apparatus by monitoring the reflected pulse 9 (FIG. 3B) which is produced at a relatively low voltage (200 volts) in the primary $L_p$ when each high voltage pulse such as 8 (FIG. 3C) is induced in the secondary $L_s$. The peak voltage of the reflected pulse 9 is directly proportional to that of the pulse 8 induced in the secondary.

In the circuit of FIG. 1, the peak voltage of the reflected pulse 9 is monitored by a diode D2 connected to the primary $L_p$ and arranged to charge a capacitor C3 to a voltage indicative of the peak voltage. A reference indicative of the maximum desired peak voltage is set by a pair of Zener diodes ZD1, 2 and if the voltage on capacitor C3 exceeds this reference, a current proportional to the difference is fed back along line 12 to the oscillator 5 until the capacitor C3 has been discharged to a voltage below the Zener diode reference level. The effect of the current flowing on line 12 is to reduce the rate at which the capacitor C1 discharges. It will be recalled that it is the capacitor C1 together with the resistor R2 which essentially define the free running rate of the oscillator. Thus, referring to FIG. 2A, the input voltage to IC1 in the free running state of the oscillator 5 moves along the line 16 as the capacitor C1 discharges, whereas in the presence of a current on line 12, the input voltage will follow the dotted line 17, thus increasing the time between the successive periods that the transistor TR1 is turned on. Thus the effect of the current on line 12 is to decrease the pulse repetition rate and hence the rate at which pulses are induced in the secondary winding $L_s$ of the transformer.

A third feedback loop is provided to reduce the pulse repetition rate of the oscillator 5 in the event of an abnormally low impedance load condition (e.g. a short circuit) occurring across the output terminals 3, 4.

Now at the output of the inverter, a load (not shown) is connected to the terminals 3, 4 and is hence in series with a resistor R3 and a capacitor C4. If the load presents a short circuit or an abnormally low impedance, the voltage across the series resistance R3 will rise, and this voltage is detected and fed back along a path 15 to one input of a comparator IC4. The value of resistor R3 is selected such that the voltage drop which may occur across it is typically of the order of 3 volts. The input from the resistor R3 to the comparator IC4 is smoothed by means of a resistor R4 and a capacitor C5. The other input to the comparator receives the output waveform of the oscillator 5 (FIG. 2C) such that the comparator is effectively enabled to produce an output only during the periods when the output of the oscillator 5 assumes the positive voltage $+V_{ss}$. The output of the comparator IC4 is applied to the base of the transistor TR3 such that is the voltage developed across the resistor R3 is sufficiently large, the transistor TR3 will be switched on and a bias current will be applied thereby to the input of the inverter IC1 of the oscillator 5, this bias current only being applied during the periods that the input to IC1 assumes a positive voltage. The bias current from TR3 slows down the rate at which the input voltage to IC1 decays to zero, and hence the pulse repetition rate of the oscillator decreases. The effect of the bias current from transistor TR3 can be seen from FIG. 2A. Normally, in the free running condition of the oscillator, the discharge of the capacitor C1 would cause the input voltage of IC1 to follow the path 16, whereas the effect of the bias current is to delay the decay of this voltage to zero, as shown by the dotted line 17, thereby decreasing the pulse repetition rate. Without this feedback loop, in the event of a short circuit in the load, the converter would attempt to pump energy as quickly as possible to the load in an attempt to maintain the load voltage, which would soon flatten the battery.

Thus the feedback loops of the converter act in such a manner as to tend to maintain the output voltage at the terminals 3, 4 constant irrespective of fluctuations in battery voltage and load current, and also reduce substantially the current drain from the battery in the event of a short circuit across the load.

Figure 4:
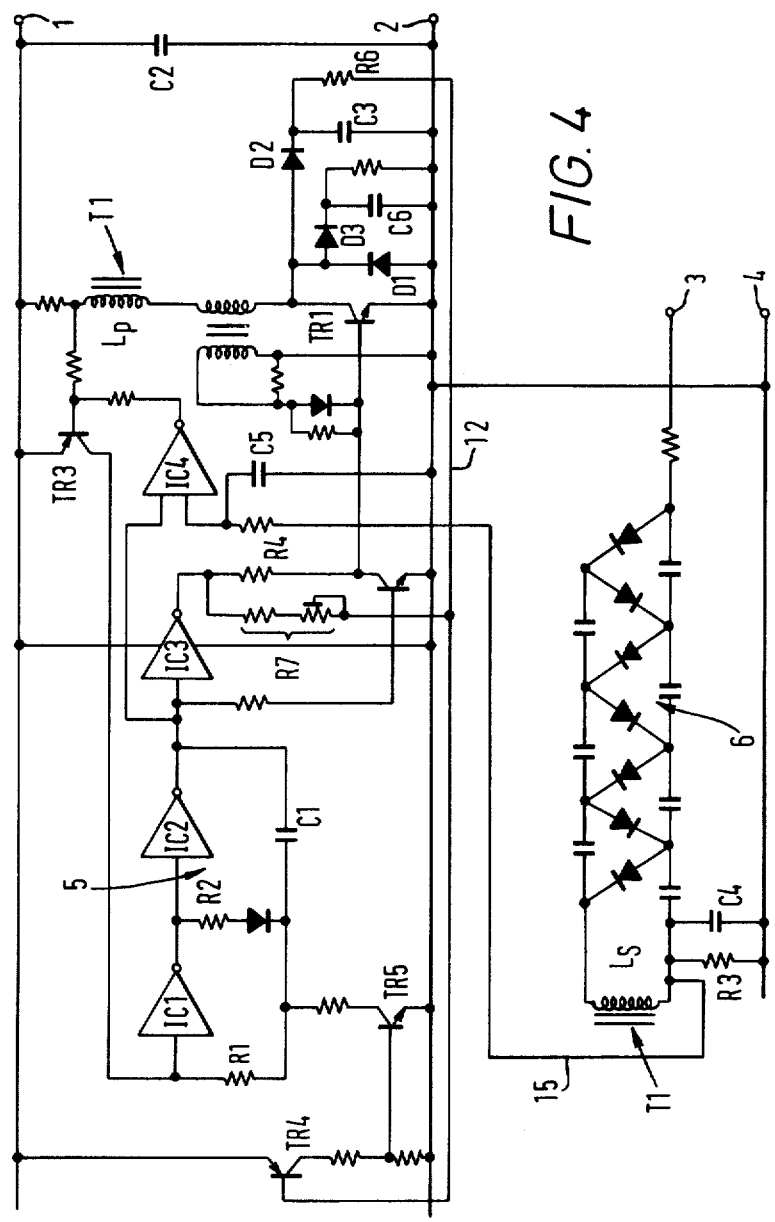
FIG. 4 is a schematic circuit diagram of another embodiment of converter in accordance with the invention.

It is however possible to modify the circuit such that the output voltage is arranged to be a function of the battery voltage. Such an arrangement is shown in FIG. 4. The circuit of FIG. 4 is similar in its operation to that of FIG. 1 and like components are marked with the same reference numerals.

In FIG. 1 the Zener diodes ZD1, ZD2, effectively maintain a constant output voltage irrespective of changes in battery voltage. However, in FIG. 4, the Zener diodes are replaced by a series resistor R6 in the feedback path 12. This arrangement causes the charge established on the capacitor C3 to be a function of output voltage and as a result, the current fed back through the path 12 is a function of output voltage. The feedback current on line 12 in conjunction with resistors R6 and R7 essentially form a potential at the base of transistor TR4, the potential being directly proportional to the output voltage. Transistor TR4 compares this potential with the battery voltage and causes transistor TR5 to control the discharge of capacitor C1 in a manner generally as previously described.

I claim:

1. A d.c. to d.c. converter for deriving from a relatively low voltage battery supply a relatively high voltage d.c. output, comprising:
   a step up transformer having means defining primary and secondary windings;
   oscillator means for producing an output which oscillates between first and second states;
   semiconductor switching means controlled by said oscillator output to switch on and off in response to said first and second states, respectively, said switching means being arranged to switch current flowing through the transformer primary in such a manner that upon switching on of the switching means the current builds up progressively and upon switching off of said switching means the current changes abruptly in a manner to induce a relatively high voltage pulse in said secondary winding and such that there is formed in said primary winding a relatively low flyback voltage pulse of a magnitude which is a function of the magnitude of said high voltage pulse;
   output means coupled to the secondary winding and arranged to derive said high voltage d.c. output from high voltage pulses induced in the secondary winding;
   first control means for controlling the frequency of oscillation of the oscillator in dependence upon the magnitude of said low flyback voltage pulse formed in the primary winding;
   second control means including
   sensing means for sensing the magnitude of the current building up in the primary;
   means for causing the oscillator output to change from said first to said second state when the current level sensed by said sensing means exceeds a given level; and
   third control means for sensing an abnormal load condition on said high voltage d.c. output and controlling the oscillation frequency of said oscillator means in accordance therewith.

2. A converter according to claim 1 wherein said output means includes a voltage multiplier.

3. A converter according to claim 1 wherein said sensing means is arranged to control timing of oscillatory signals produced by the oscillator means.

4. A converter according to claim 1 wherein said third control means includes means to sense the output current of said output means and means to reduce the rate of operation of the oscillator if the output current exceeds a given level.

5. A converter according to claim 4 wherein the oscillator means comprises a pair of CMOS inverters and a time constant circuit.

6. A converter according to claim 1 wherein said first control means samples the peak value of said low flyback voltage pulse and to feed said sampled value to said oscillator means in such a manner as to control its rate of operation.

7. A converter according to claim 1 wherein said semiconductor switching means is connected in series with said primary winding, and wherein said oscillator means feeds a rectangular waveform to cause cyclic switching of said semiconductor switching means.

8. A converter according to claim 7 including a capacitor arranged to store electrical energy from said low voltage pulse in the primary winding.

* * * * *